US012629824B2

(12) United States Patent
Fu et al.

(10) Patent No.: US 12,629,824 B2
(45) Date of Patent: May 19, 2026

(54) TEACHING DEVICE AND ROBOT SYSTEM

(71) Applicant: Fanuc Corporation, Yamanashi (JP)

(72) Inventors: Wanfeng Fu, Minamitsuru-gun (JP);
Yuta Namiki, Minamitsuru-gun (JP)

(73) Assignee: FANUC CORPORATION, Yamanashi (JP)

( * ) Notice: Subject to any disclaimer, the term of this patent is extended or adjusted under 35 U.S.C. 154(b) by 99 days.

(21) Appl. No.: 18/693,667

(22) PCT Filed: Sep. 30, 2021

(86) PCT No.: PCT/JP2021/036205
§ 371 (c)(1),
(2) Date: Mar. 20, 2024

(87) PCT Pub. No.: WO2023/053368
PCT Pub. Date: Apr. 6, 2023

(65) Prior Publication Data
US 2024/0383134 A1     Nov. 21, 2024

(51) Int. Cl.
*B25J 9/16*          (2006.01)
*B25J 13/06*          (2006.01)
(52) U.S. Cl.
CPC ............. *B25J 9/163* (2013.01); *B25J 9/1697* (2013.01); *B25J 13/06* (2013.01)
(58) Field of Classification Search
None
See application file for complete search history.

(56) References Cited

U.S. PATENT DOCUMENTS

| 2005/0071048 A1 | 3/2005 | Watanabe et al. |
| 2006/0241792 A1 | 10/2006 | Pretlove et al. |
| 2009/0153672 A1 | 6/2009 | Fujimori et al. |
| 2019/0329404 A1 | 10/2019 | Takeuchi |

(Continued)

FOREIGN PATENT DOCUMENTS

| JP | 2005103681 A | 4/2005 |
| JP | 2009146075 A | 7/2009 |

(Continued)

OTHER PUBLICATIONS

International Search Report (PCT/ISA/210) with English translation and Written Opinion (PCT/ISA/237) mailed on Dec. 14, 2021, by the Japanese Patent Office as the International Searching Authority for International Application No. PCT/JP2021/036205.

*Primary Examiner* — Ryan Rink
(74) *Attorney, Agent, or Firm* — BUCHANAN INGERSOLL & ROONEY PC

(57)          ABSTRACT
A teaching device is used in an industrial machine system in which information is acquired using a sensor and a task is performed with respect to a workpiece. The teaching device includes: an execution history screen display unit for displaying an execution history screen that presents one or more pieces of execution history pertaining to an execution result of a program performing sensor-based processing, and for accepting an operation to select a single piece of execution history; and a modification screen display unit for restoring the selected single piece of execution history to a program and displaying a modification screen for modifying a configuration parameter of the program in which the execution history is restored.

9 Claims, 9 Drawing Sheets

(56)  References Cited

U.S. PATENT DOCUMENTS

| | | | |
|---|---|---|---|
| 2020/0167886 | A1 | 5/2020 | Cho et al. |
| 2024/0033930 | A1* | 2/2024 | Narasaki ................. G06T 17/00 |

FOREIGN PATENT DOCUMENTS

| | | | |
|---|---|---|---|
| JP | 2014184494 | A | 10/2014 |
| JP | 2019188545 | A | 10/2019 |
| JP | 2020075354 | A | 5/2020 |
| JP | 2020082273 | A | 6/2020 |
| JP | 2020-202449 | A | 12/2020 |
| JP | 2021-026152 | A | 2/2021 |

* cited by examiner

TEACHING DEVICE AND ROBOT SYSTEM

CROSS REFERENCE TO RELATED APPLICATIONS

This is the U.S. National Phase application of PCT/JP2021/036205, filed Sep. 30, 2021, the disclosures of this application being incorporated herein by reference in their entireties for all purposes.

FIELD OF THE INVENTION

The present invention relates to a teaching device and a robot system.

BACKGROUND OF THE INVENTION

A robot system configured to detect a workpiece by a visual sensor mounted on a robot and execute predetermined work, such as picking-up of a workpiece, is known. When non-detection or erroneous detection of a workpiece occurs in such a robot system, the robot system does not operate properly. In that case, adjustment of setting parameters relating to the function of detecting a workpiece by a visual sensor (teaching of the setting parameters to the robot system) is preferred in order for proper detection to be performed in the robot system.

With regard to a configuration of a device displaying a 3D model of a robot, PTL 1 describes "a model display part 140 displaying the posture of a robot device 1 in a form of a 3D model, based on previously stored model data of the robot device 1, is provided (paragraph 0097)" and "a playback bar 141 is provided under the model display part 140, and a playback button 144 and a pause button 145 for operating the actual robot device 1 to which operations have been taught are provided (paragraph 0099)."

PATENT LITERATURE

[PTL 1] Japanese Unexamined Patent Publication (Kokai) No. 2020-75354

SUMMARY OF THE INVENTION

In general, when performing, on a teaching device, parameter adjustment relating to the detection function by a visual sensor based on a previously captured image, a user needs to carry out a procedure for first opening a detection program for the detection function by a visual sensor, and then adjusting parameters of the detection program while checking an execution history of the detection program. However, such work of opening a detection program screen, and adjusting the parameters while checking an execution history of the detection program when a problem occurs in detection of a workpiece by a visual sensor is troublesome and burdensome for the user. Improved usability in regard to the parameter adjustment to be performed by a user on a teaching device is required.

An embodiment of the present disclosure is a teaching device used in a system based on an industrial machine configured to acquire information by using a sensor and perform work on a workpiece, the teaching device including: an execution history screen display unit configured to display an execution history screen presenting one or more execution histories related to an execution result of a program for performing processing using the sensor and accept an operation of selecting an execution history from the one or more execution histories; and an adjustment screen display unit configured to restore the selected execution history to the program and display an adjustment screen for adjusting a setting parameter of the program to which the selected execution history has been restored.

Another embodiment of the present disclosure is a robot system including: a sensor; a robot; a robot controller configured to acquire information from the sensor and cause the robot to execute predetermined work on a workpiece; and the aforementioned teaching device connected to the robot controller, wherein the robot controller controls execution of a program for performing processing using the sensor.

According to the aforementioned configuration, by selecting an execution history, the execution history can be restored to a program and a user can perform adjustment of a setting parameter of the program, which enables a user to efficiently perform adjustment of the setting parameter of the program. As a result, improved usability in regard to the parameter adjustment of the program can be realized.

The objects, the features, and the advantages of the present invention, and other objects, features, and advantages will become more apparent from the detailed description of typical embodiments of the present invention illustrated in accompanying drawings.

DETAILED DESCRIPTION OF EMBODIMENTS OF THE INVENTION

Figure 1:
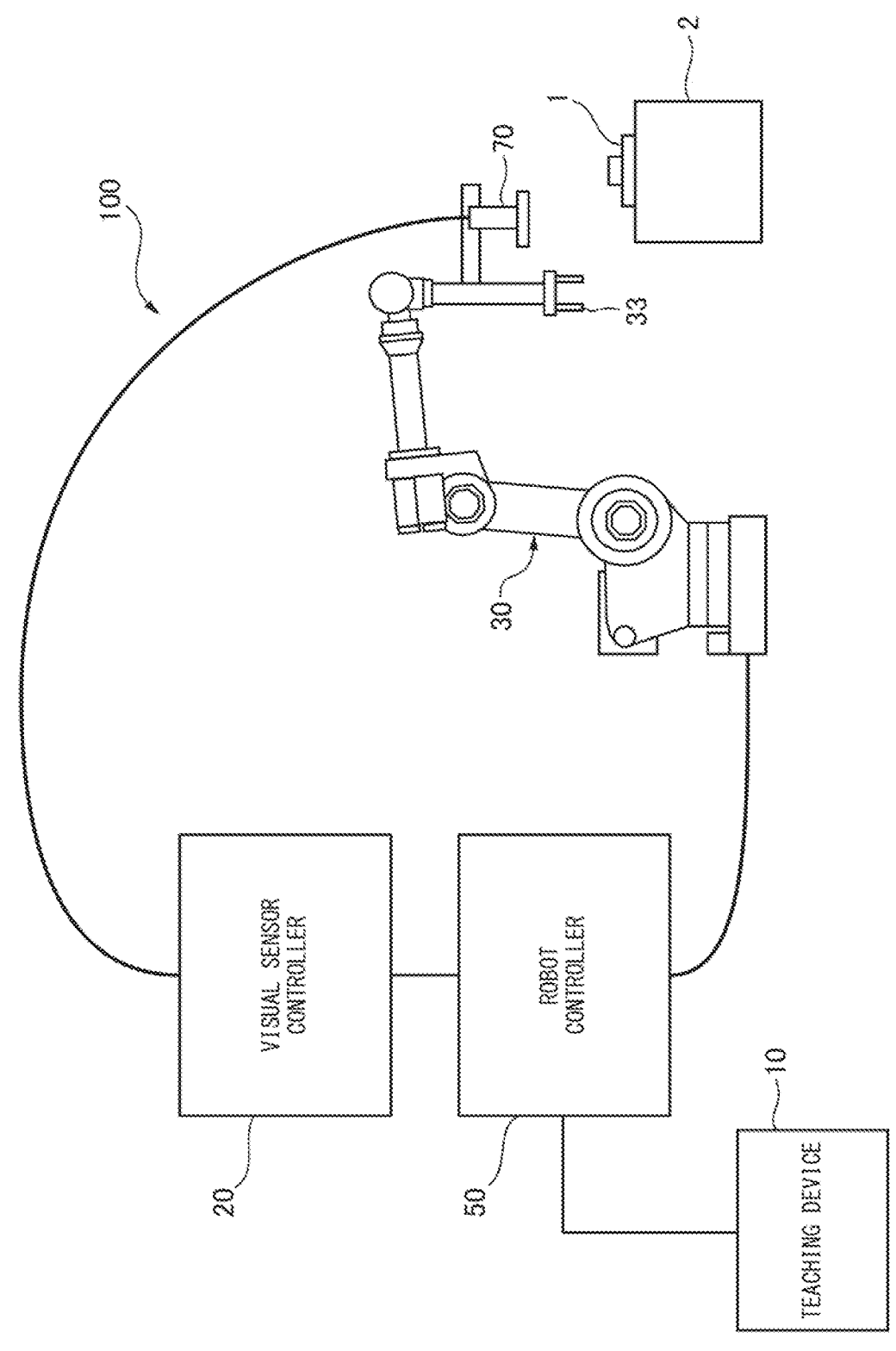
FIG. 1 is a diagram illustrating an entire configuration of a robot system including a teaching device according to an embodiment.

Next, embodiments of the present disclosure will be described with reference to drawings. In the referenced drawings, similar components or functional parts are given similar reference signs. For ease of understanding, the drawings use different scales as appropriate. Further, configurations illustrated in the drawings are examples for implementing the present invention, and the present invention is not limited to the illustrated configurations.

FIG. 1 is a diagram illustrating an entire configuration of a robot system 100 including a teaching device 10 according to an embodiment. The robot system 100 is configured to acquire information by using a sensor and perform predetermined work on a target object (also hereinafter described as a workpiece), based on the information. It is assumed in the present embodiment that the sensor is a visual sensor. In this case, processing using the visual sensor may include detection, determination, and various other types of processing. A case of detecting a workpiece will be described as processing using the visual sensor in the following description.

The robot system 100 includes a robot 30 including an arm tip provided with a hand 33, a robot controller 50 controlling the robot 30, a teaching device 10 connected to the robot controller 50, a visual sensor 70 attached to an arm tip of the robot 30, and a visual sensor controller 20 controlling the visual sensor 70. The visual sensor controller 20 is connected to the robot controller 50. The robot system 100 can detect a workpiece 1 on a workbench 2 by the visual sensor 70 and can handle the workpiece 1 with the hand 33 mounted on the robot 30.

The visual sensor controller 20 has a function of controlling the visual sensor 70 and a function of performing image processing on an image captured by the visual sensor 70. The visual sensor controller 20 detects the position of the workpiece 1 from the image captured by the visual sensor 70 and provides the detected position of the workpiece 1 to the robot controller 50. Thus, the robot controller 50 can correct a teaching position and execute picking-up of the workpiece 1 etc.

The visual sensor 70 may be a camera capturing an image of a gray image and/or a color image, or a stereo camera or a three-dimensional sensor that can acquire a range image and/or a three-dimensional point group. A plurality of visual sensors may be disposed in the robot system 100. The visual sensor controller 20 holds a model pattern of a target object and executes image processing of detecting a target object in a captured image by pattern matching of an image of the target object and a model pattern. While the visual sensor controller 20 is configured as a device separate from the robot controller 50 in FIG. 1, a function as the visual sensor controller 20 may be embedded in the robot controller 50.

As will be described in detail below, by selecting an execution history from an execution history screen displaying execution histories of a detection program using the visual sensor 70 and performing a predetermined operation, the teaching device 10 provides a function of restoring a predetermined parameter in the selected execution history to the detection program and making a transition to a parameter adjustment screen for performing parameter adjustment of the detection program. The function of restoring an execution history (such as an image and/or a parameter) to a detection program and performing parameter adjustment may be herein referred to as image playback. Such configuration enables execution of image playback directly from the execution history screen and efficient parameter adjustment of a detection program, which improves user-friendliness (usability) in regard to the parameter adjustment.

Figure 2:
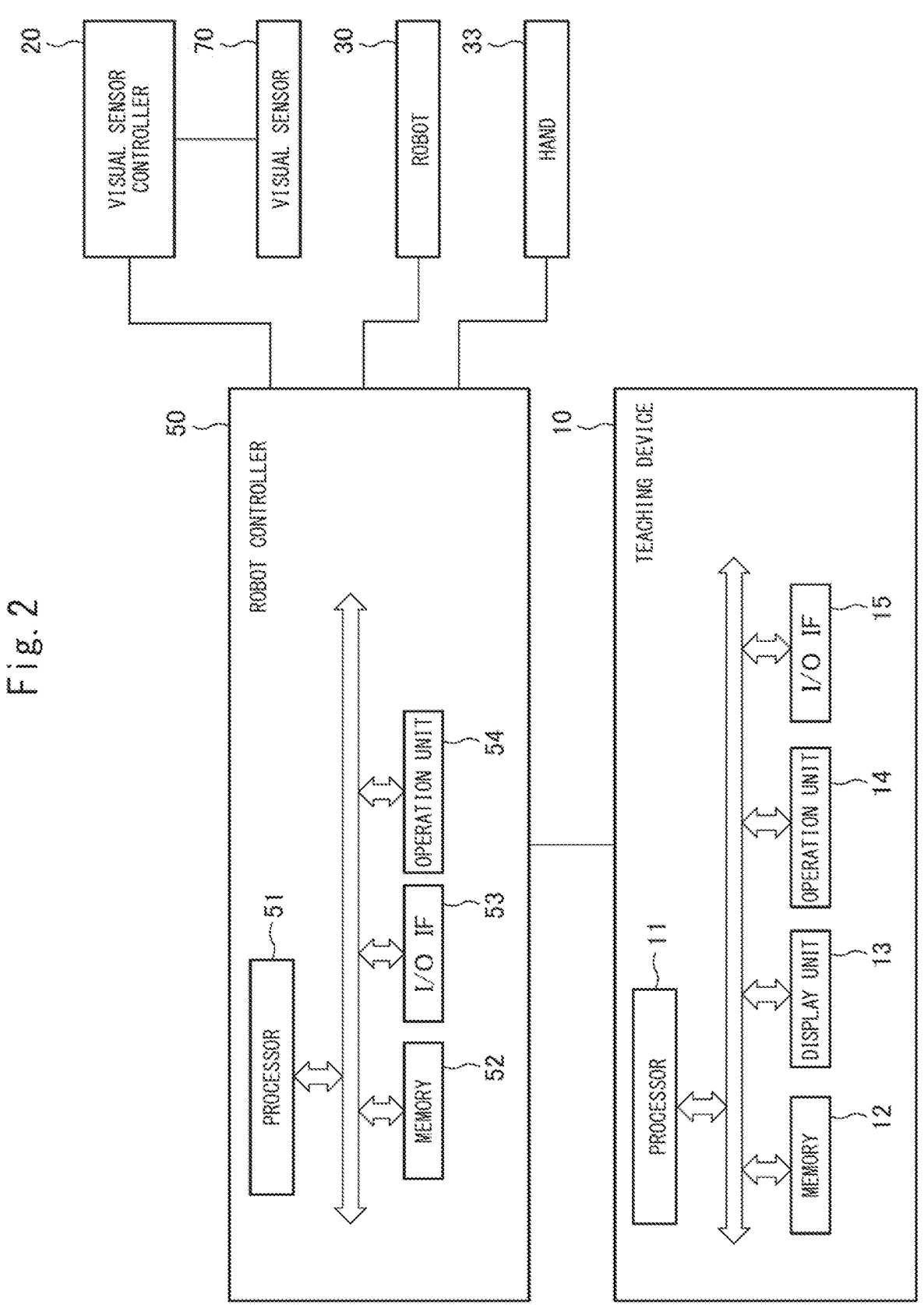
FIG. 2 is a diagram illustrating a hardware configuration example of a robot controller and the teaching device.

FIG. 2 is a diagram illustrating a hardware configuration example of the robot controller 50 and the teaching device 10. The robot controller 50 may have a configuration as a common computer including a memory 52 (such as a ROM, a RAM, or a nonvolatile memory), an input-output interface 53, an operation unit 54 including various operation switches, etc. that are connected to a processor 51 through a bus. The teaching device 10 may have a configuration as a common computer including a memory 12 (such as a ROM, a RAM, or a nonvolatile memory), a display unit 13, an operation unit 14 configured with an input device such as a keyboard (or software keys), an input-output interface 15, etc. that are connected to a processor 11 through a bus. Various information processing devices such as a teach pendant, a tablet terminal, and a personal computer may be used as the teaching device.

The visual sensor controller 20 may also have a configuration as a common computer including a processor, a memory (such as a ROM, a RAM, or a nonvolatile memory), an input-output interface, etc.

Figure 3:
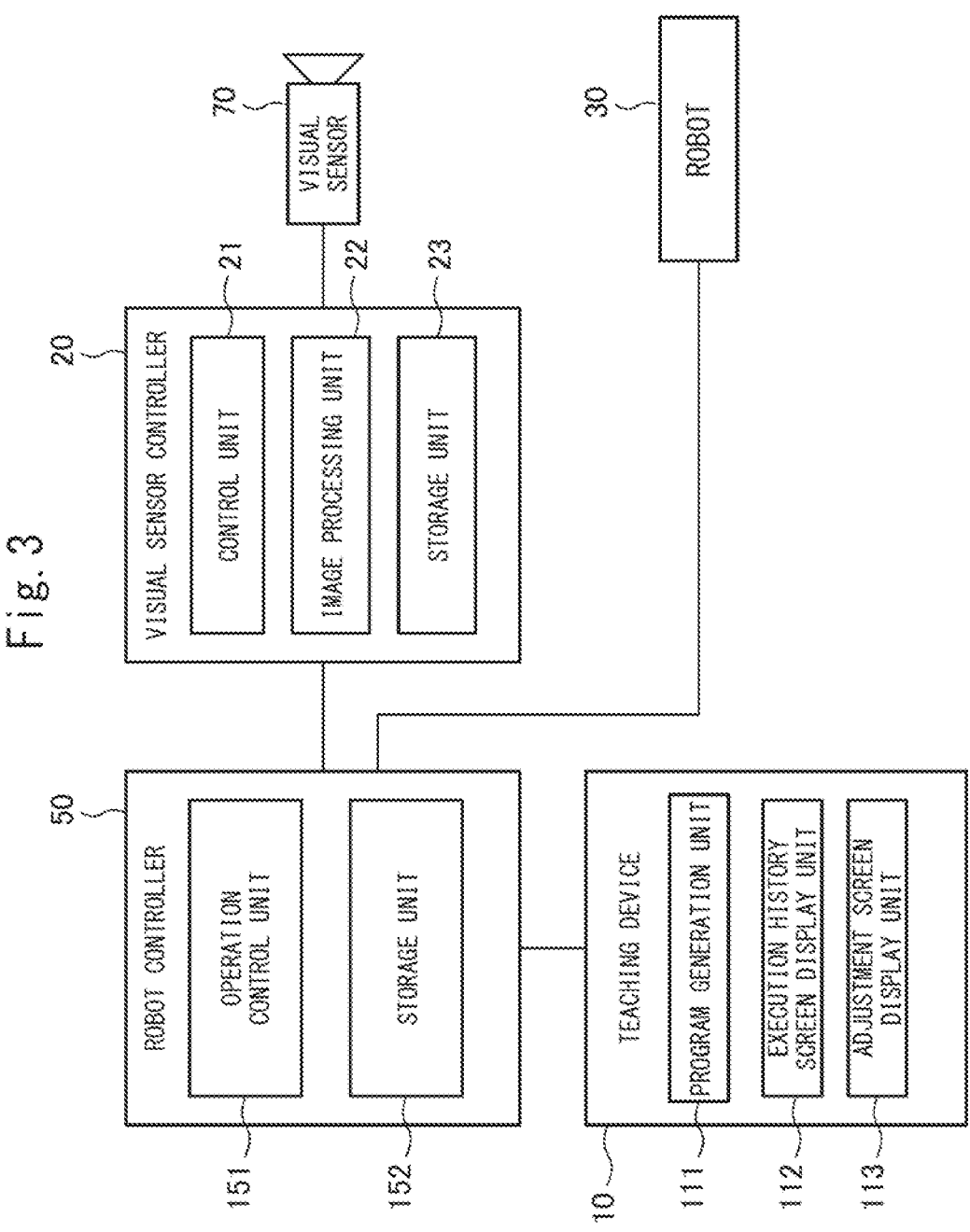
FIG. 3 is a functional block diagram of the teaching device, the robot controller, and a visual sensor controller.

FIG. 3 is a functional block diagram of the teaching device 10, the robot controller 50, and the visual sensor controller 20.

The visual sensor controller 20 includes a control unit 21, an image processing unit 22, and a storage unit 23. The control unit 21 performs control related to a function of the visual sensor 70 in accordance with a command sent from the robot controller 50. The control by the control unit 21 includes controlling the visual sensor 70 and causing the image processing unit 22 to execute image processing. The image processing unit 22 performs pattern matching and various other types of image processing. Various types of information (such as model data used for pattern matching, calibration data, and various types of setting information) required for performing various types of processing by the visual sensor 70, a captured image, and history information which will be described later are stored in the storage unit 23.

As illustrated in FIG. 3, the robot controller 50 includes an operation control unit 151 controlling operation of the robot 30 in accordance with an operation program and a storage unit 152 in which various types of information such as the operation program and setting information are stored. The operation program includes a detection program for performing detection by the visual sensor 70. The operation control unit 151 sends a command in the detection program to the visual sensor controller 20.

The information stored in the storage unit 23 in the visual sensor controller 20 includes an execution history related to an execution result of a detection program by the visual sensor 70. The execution history includes at least one item out of a captured image, the position and the posture of the robot 30 at the time of measurement by the visual sensor, a processing result by the visual sensor 70, information about non-detection or erroneous detection, and various parameters of the detection program. The execution history is stored in a nonvolatile memory or a volatile memory constituting the storage unit 23.

The teaching device 10 can acquire or collect history information stored in the visual sensor controller 20 through the robot controller 50.

The history information may be stored in the storage unit 152 of the robot controller 50.

The teaching device 10 includes a program generation unit 111 for generating an operation program, an execution history screen display unit 112, and an adjustment screen display unit 113. The program generation unit 111 provides various assistance functions for creating and editing an operation program by a user. As an example, the program generation unit 111 provides a function of assisting programming of an operation program using icons.

The execution history screen display unit 112 acquires an execution history of a program for performing processing by the visual sensor (assumed to be a detection program) for each execution from the visual sensor controller 20 and displays an execution history screen (a user interface) including a list of execution histories of the detection program for respective executions. Further, the execution history screen display unit 112 accepts a user operation of selecting an execution history.

In response to a selection operation on execution histories displayed on the execution history screen, the adjustment screen display unit 113 restores predetermined parameter information included in the selected execution history to the detection program by the visual sensor and displays a parameter adjustment screen (a user interface) for adjusting the detection program to which the predetermined parameter of the selected execution history has been restored.

Figure 4:
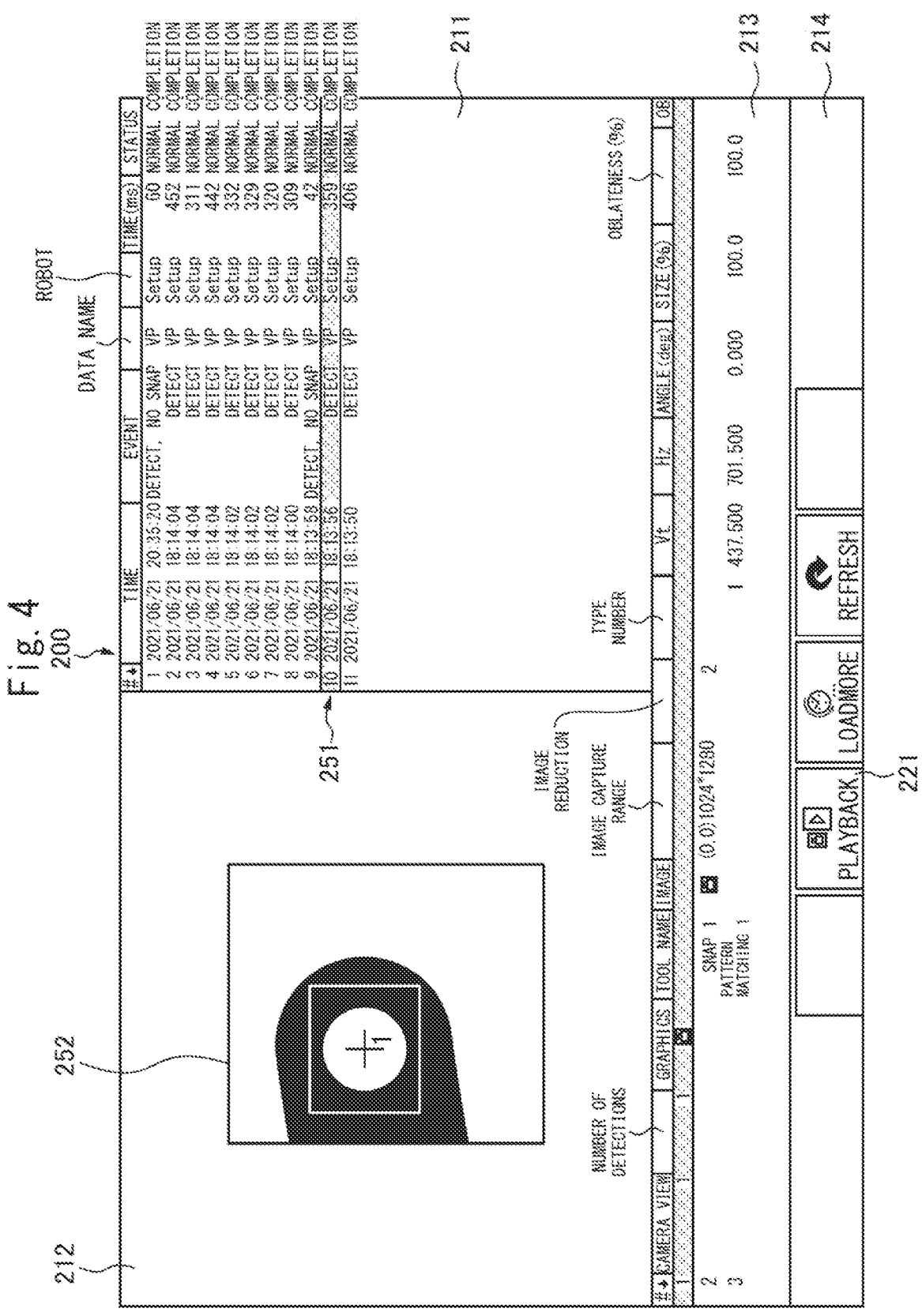
FIG. 4 is a diagram illustrating an example of an execution history screen displayed on a display unit in the teaching device by an execution history screen display unit.

FIG. 4 is a diagram illustrating an example of an execution history screen 200 displayed on the display unit 13 of the teaching device 10 by the execution history screen display unit 112. As illustrated in FIG. 4, the execution history screen 200 includes a history list display region 211, a history image display region 212, a program display region 213, and an operation button display region 214 displaying various operation buttons.

A list of execution histories for respective executions of a detection program is displayed in the history list display region 211. As an example, FIG. 4 illustrates a case of 11 execution histories being included. A history image (captured image) included in an execution history selected in the history list display region 211 is displayed in the history image display region 212. A state of a history image 252 included in an execution history 251 selected in the history list display region 211 being displayed is illustrated.

Details of a detection program are displayed in the program display region 213. The operation button display region 214 includes a playback button 221 for transition to an adjustment screen for restoring a currently selected execution history to the detection program and performing parameter adjustment. By selecting a desired execution history and operating the playback button 221, a user can make a transition to the parameter adjustment screen for restoring the selected execution history to the detection program and performing parameter adjustment (teaching).

Figure 5:
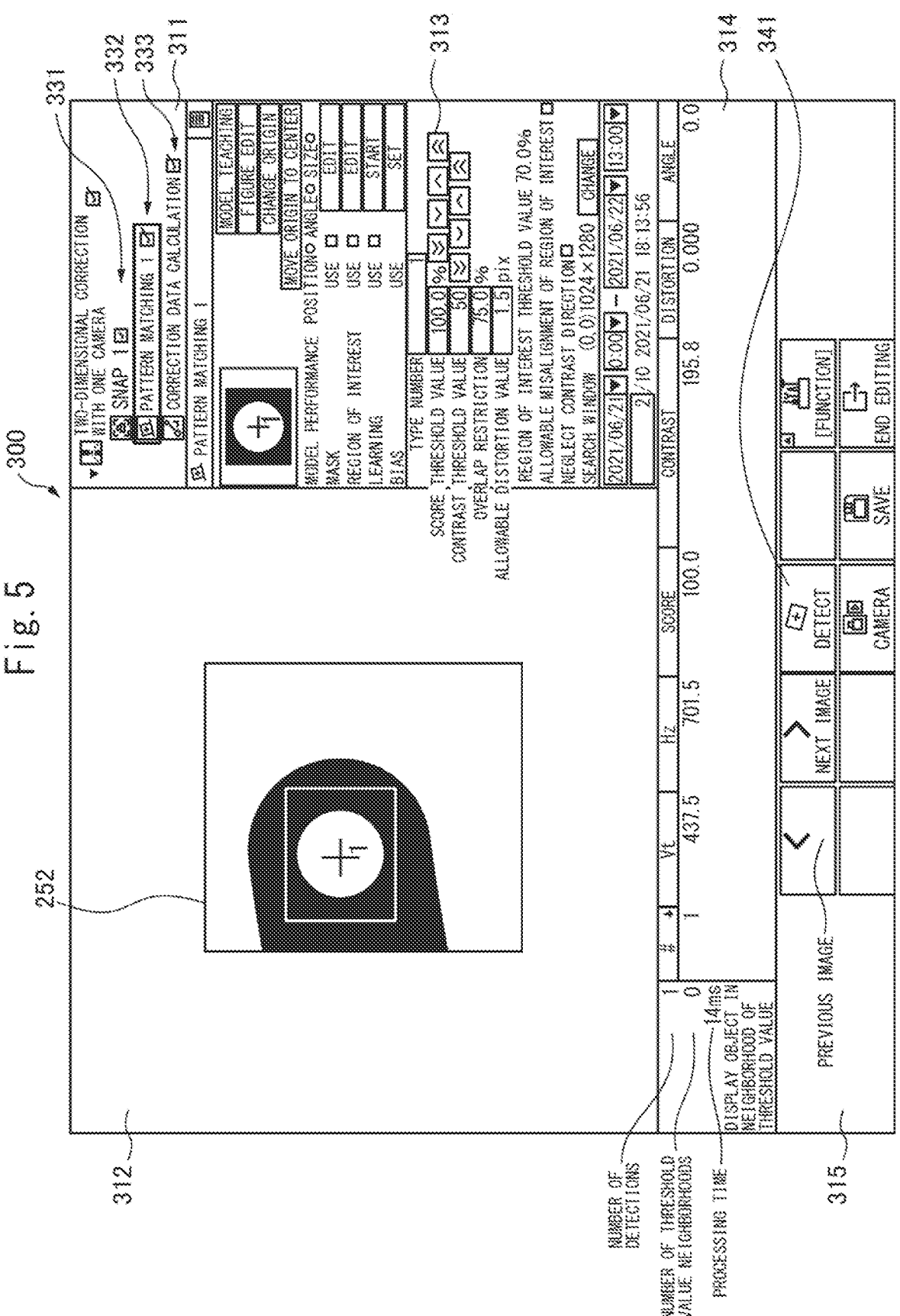
FIG. 5 is a diagram illustrating an example of a parameter adjustment screen displayed by operating a playback button in the display state in FIG. 4.

FIG. 5 illustrates an example of a parameter adjustment screen 300 displayed by operating the playback button 221 in the display state in FIG. 4. As illustrated in FIG. 5, the parameter adjustment screen 300 includes a detection program display region 311 for displaying a detection program, a captured image display region 312 for displaying a history image (or a captured image), a parameter display region 313, a detection result display region 314, and an operation button display region 315 displaying various operation buttons.

As an example, a detection program named "TWO-DIMENSIONAL CORRECTION WITH ONE CAMERA" is displayed in the detection program display region 311. The detection program includes a snapshot icon 331, a pattern matching icon 332, and a correction data calculation icon 333. The snapshot icon 331 represents an instruction to execute image capture by the visual sensor 70. The pattern matching icon 332 represents an instruction to perform detection of a workpiece on a captured image by pattern matching. The correction data calculation icon 333 represents an instruction to calculate correction data for correcting a teaching position, based on a workpiece position acquired by pattern matching.

In the initial state after transition from the execution history screen 200 in FIG. 4 to the parameter adjustment screen 300, the history image 252 in the execution history 251 selected on the execution history screen 200 is displayed in the captured image display region 312.

Values of parameters in the execution history 251 selected on the execution history screen 200 in FIG. 4 in a restored state are displayed in the parameter display region 313 as various parameters of the detection program. A state of the pattern matching icon 332 in the detection program being selected in the detection program display region 311 and various parameters related to the pattern matching icon 332 being displayed in the parameter display region 313 is illustrated. The parameters related to the pattern matching icon 332 include a threshold value for a score, a threshold value for contrast, and various other parameters. By selecting another icon in the detection program display region 311, parameters (restored parameters) for the icon can be displayed and adjusted in the parameter display region 313.

A processing result of the detection program is displayed in the detection result display region 314. A restored state of a processing result (such as the number of detections, a score 100.0, and contrast 195.8) included in the execution history 251 selected in the execution history screen 200 in FIG. 4 is illustrated.

Operation buttons for performing various operations are displayed in the operation button display region 315. By depressing a detection button 341 after adjusting various parameters in the parameter display region 313, the detection program can be executed with new parameters, and the result can be checked.

Figure 6:
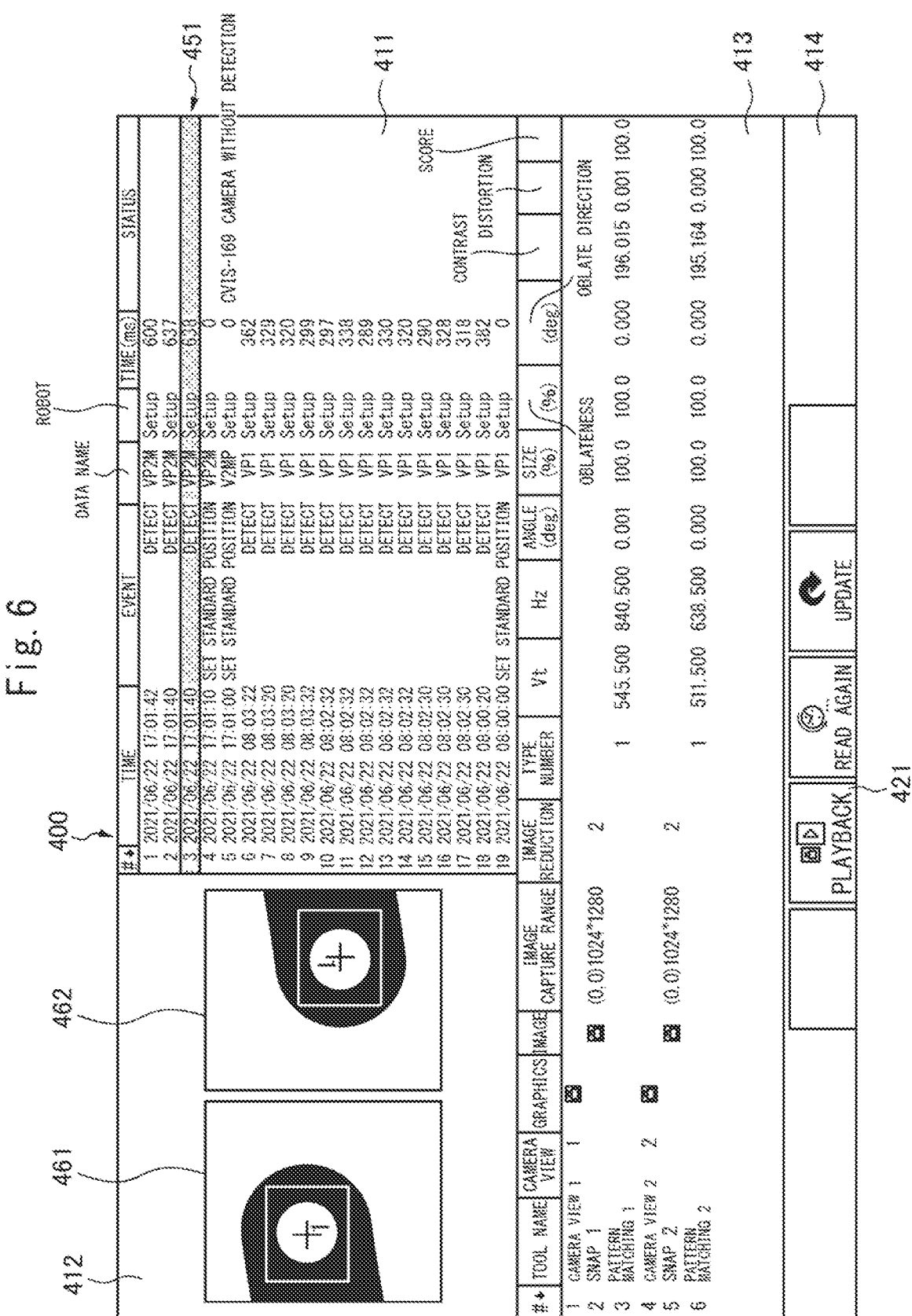
FIG. 6 is a diagram illustrating an example of an execution history screen related to detection from a plurality of viewpoints.

FIG. 6 illustrates another example of the execution history screen. An execution history screen 400 in FIG. 6 illustrates an execution history of a detection program configured to perform detection of a target part from a plurality of viewpoints. An example of using a detection program based on a stereo detection method of detecting a target object from two viewpoints will be described. As illustrated in FIG. 6, the execution history screen 400 includes a history list display region 411, a history image display region 412, a program display region 413, and an operation button display region 414 displaying various operation buttons.

A list of execution histories of the detection program for respective executions is displayed in the history list display region 411. As an example, FIG. 6 illustrates a case of 19 execution histories being included. A history image (captured image) included in an execution history selected in the history list display region 411 is displayed in the history image display region 412. A state of two history images 461 and 462 (history images of a target object captured from two viewpoints) included in an execution history 451 selected in the history list display region 411 being loaded from the execution history 451 and being displayed is illustrated. Thus, in this example, when an execution history based on a plurality of viewpoints is selected and image playback is executed, history images based on the plurality of viewpoints are collectively loaded and are displayed on the same screen. Such a configuration enables a user to collectively check the history images of a workpiece from all the viewpoints and efficiently perform adjustment and checking of the parameters of the detection program.

Details of the detection program are displayed in the program display region 413. The operation button display region 414 includes a playback button 421 for transition to a screen for restoring a currently selected execution history to the detection program and performing parameter adjustment. By selecting a desired execution history and operating the playback button 421, a user can make a transition to a parameter adjustment screen for restoring the selected execution history to the detection program and performing parameter adjustment.

Figure 7:
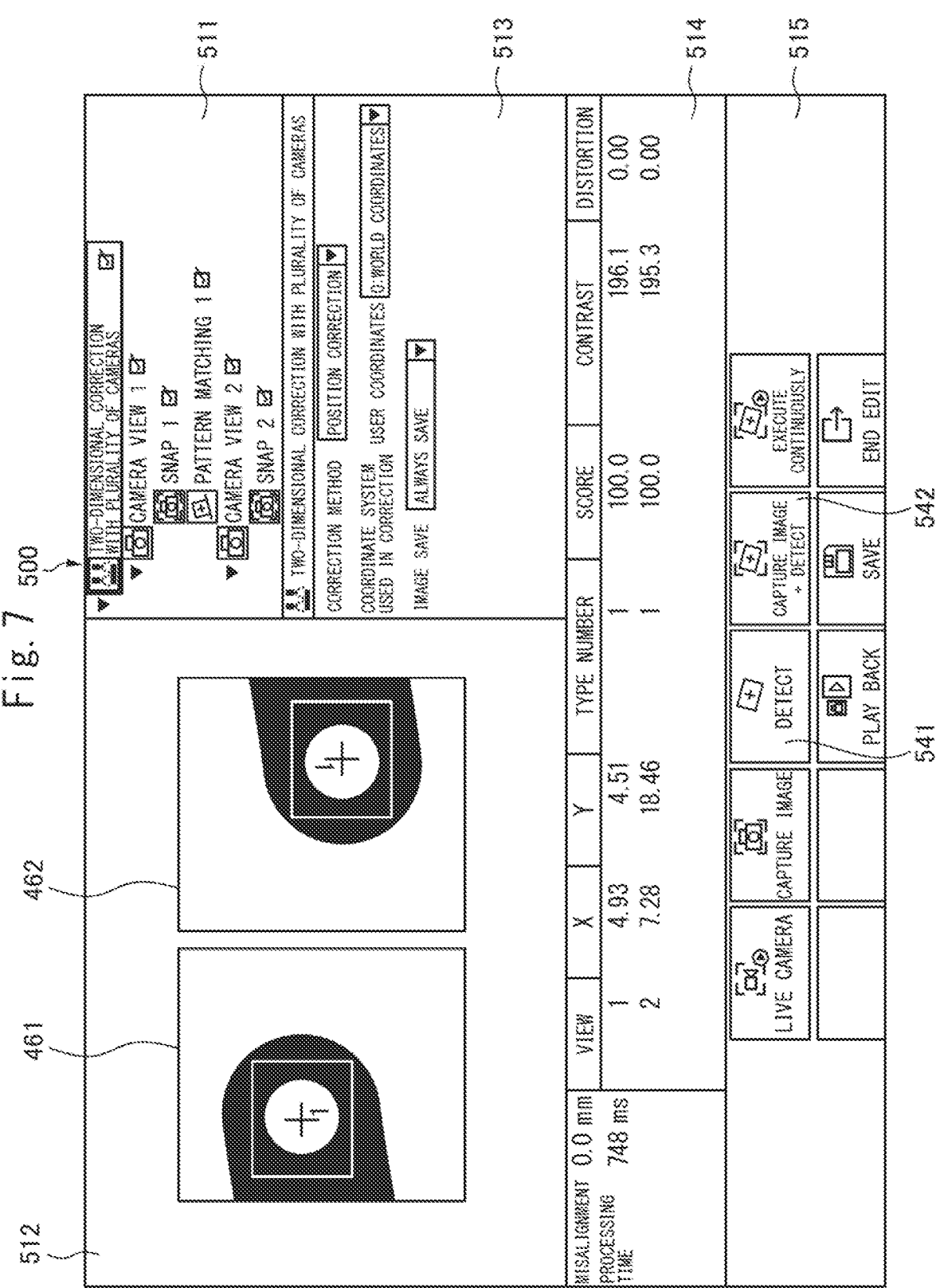
FIG. 7 is a diagram illustrating an example of a parameter adjustment screen displayed by operating a playback button in the display state in FIG. 6.

FIG. 7 illustrates an example of a parameter adjustment screen 500 displayed by operating the playback button 421 in the display state in FIG. 6. As illustrated in FIG. 7, the parameter adjustment screen 500 includes a detection program display region 511 displaying a detection program, a captured image display region 512 for displaying a history image (or a captured image), a parameter display region 513, a detection result display region 514, and an operation button display region 515 displaying various operation buttons.

As an example, a detection program named "TWO-DIMENSIONAL CORRECTION WITH PLURALITY OF CAMERAS" is displayed in the detection program display region 511. The detection program captures a target object from two viewpoints and performs position correction and therefore is configured to include two sets of detection processing each including a snapshot icon and a pattern matching icon.

In the initial state after transition from the execution history screen 400 in FIG. 6 to the parameter adjustment screen 500, the two history images 461 and 462 contained in the execution history 451 selected on the execution history screen 400 are displayed in the captured image display region 512.

Values of parameters in the execution history 451 selected on the execution history screen 400 in FIG. 6 in a restored state are displayed in the parameter display region 513 as various parameters of the detection program. A state of various parameters related to the icon (the "TWO-DIMENSIONAL CORRECTION WITH PLURALITY OF CAMERAS" icon) selected in the detection program display region 511 being displayed in the parameter display region 513 is illustrated. By selecting another icon in the detection program display region 511, parameters (restored parameters) for the icon can be displayed and adjusted in the parameter display region 513.

A processing result of the detection program is displayed in the detection result display region 514. A state of a processing result (such as a score 100.0 and contrast 195.8) included in the execution history 451 selected on the execution history screen 400 in FIG. 6 being restored is illustrated.

Operation buttons for performing various operations are displayed in the operation button display region 515. Depression of a detection button 541 or an "CAPTURE IMAGE+DETECT" button 542 after adjusting various parameters in the parameter display region 513 enables execution of the detection program with new parameters and checking the result.

Figure 8:
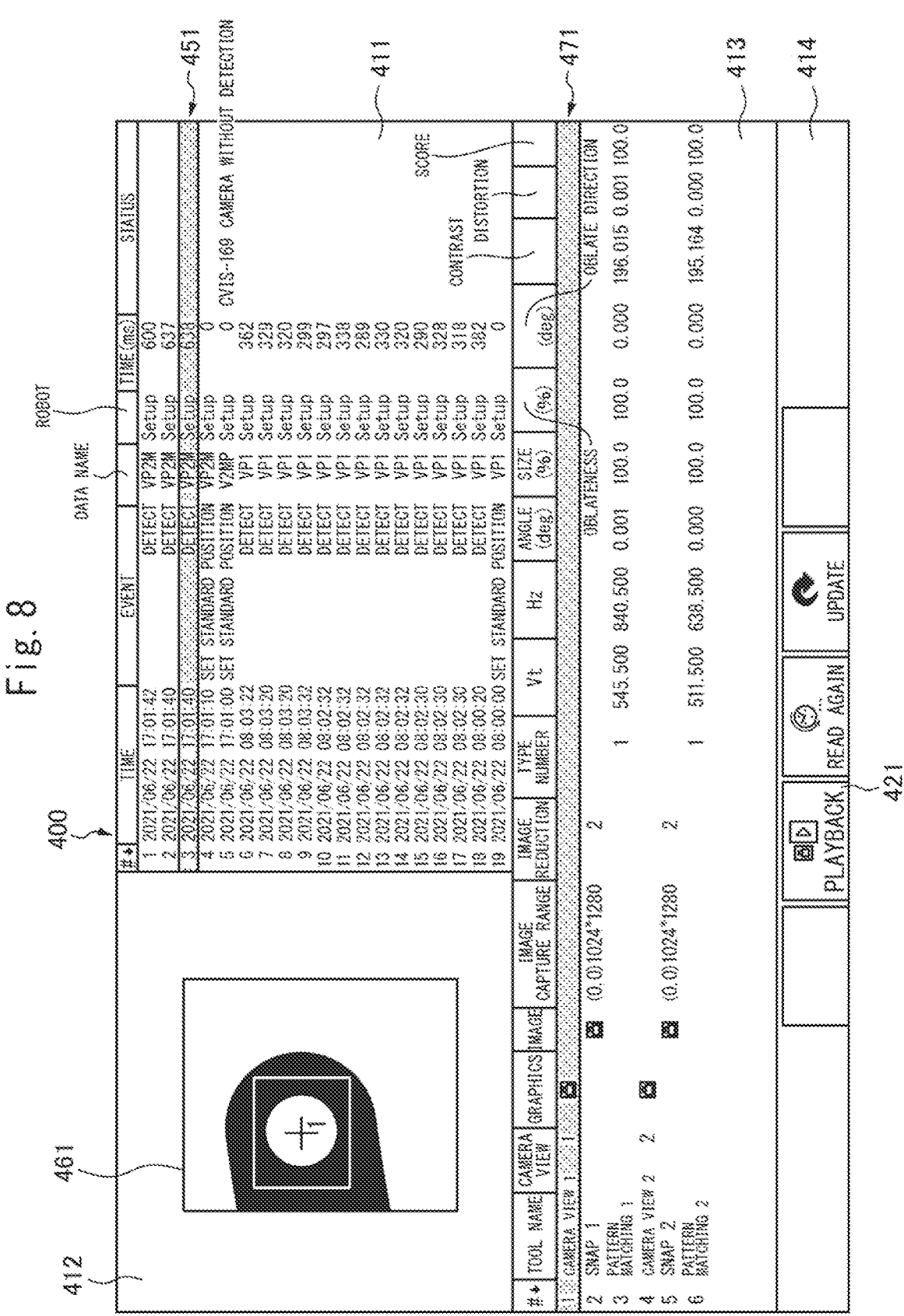
FIG. 8 is a diagram for illustrating an operation example when an image playback function is executed on a history image based on a single viewpoint in a case of an execution history related to detection from a plurality of viewpoints is selected.

Next, an operation example when the image playback function is executed on a history image based on a single viewpoint in a case of an execution history related to detection from a plurality of viewpoints being selected will be described with reference to FIG. 8. FIG. 8 illustrates a state of a program for performing detection from one viewpoint (a "CAMERA VIEW 1" icon in FIG. 8) in a detection program for performing detection from two viewpoints being selected in the program display region 413 on the execution history screen 400 illustrated in FIG. 6.

When a program for performing detection from one viewpoint ("CAMERA VIEW 1" indicated by a sign 471 in this example) is selected in the program display region 413, the history image display region 412 enters a state of displaying only the history image 461 in the program for performing detection from one viewpoint. By depressing the playback button 421 in this state, a user can make a transition to a parameter adjustment screen (such as the parameter adjustment screen 300 as illustrated in FIG. 5) for restoring parameters related to the history image 461 based on one viewpoint currently displayed in the history image display region 412 to the detection program and performing parameter adjustment.

Figure 9:
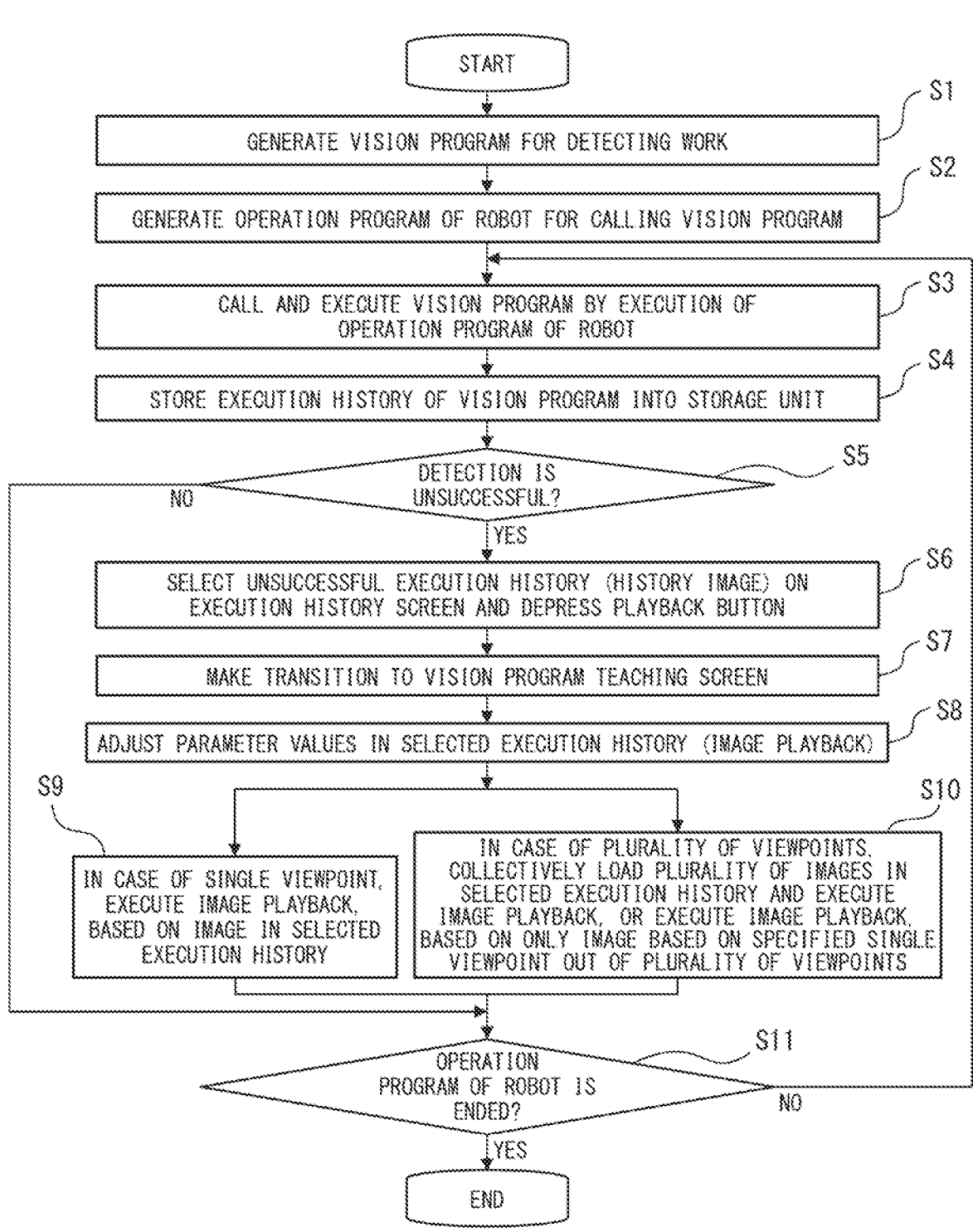
FIG. 9 is a flowchart illustrating a series of processing operations from generation of a detection program to execution of image playback.

FIG. 9 illustrates an example of a series of processing operations from generation of a detection program to execution of image playback as a flowchart. The flow of the series of processing operations will be described with reference to FIG. 9.

First, generation of a program for detecting a workpiece by the visual sensor 70 (hereinafter also described as a vision program) is performed by a user. The user creates a vision program by using the teaching device 10 (step S1). Furthermore, the user creates an operation program of the robot 30 for calling the vision program by using the teaching device 10 (step S2).

Next, by performing a predetermined operation on the teaching device 10 by the user, the operation program is sent to the robot controller 50, and the operation program is executed. By execution of the operation program, the vision program is called and executed (step S3). With completion of execution of the vision program, an execution history thereof is stored into the storage unit 23 in the visual sensor controller 20 (step S4).

Next, whether the detection result of the vision program is unsuccessful is determined (step S5). The determination may be made by the user viewing the execution history, or the teaching device 10 may be configured to automatically make the determination from the execution history. When the detection is unsuccessful (S5: YES), the processing advances to step S6. When the detection is successful (S5: NO), the processing advances to step S11. In step S6, the user selects an execution history (a history image) with unsuccessful detection from a list of execution histories displayed on the execution history screen and depresses the playback button (step S6). Thus, the display screen of the teaching device 10 makes a transition to a parameter adjustment screen for adjusting (teaching) various parameters of the vision program (step S7). Various parameters in the execution history selected in step S6 are restored to the parameter adjustment screen. The user checks parameter values in the execution history and adjusts the parameter values (step S8).

In a case of a vision program for performing detection from a single viewpoint, image playback is executed on an image in a selected execution history (step S9). On the other hand, in a case of a vision program for performing detection from a plurality of viewpoints, history images based on the plurality of viewpoints are collectively loaded and image playback is executed as described with reference to FIG. 7, or image playback is executed on a history image based on a selected single viewpoint out of a plurality of viewpoints as described with reference to FIG. 8 (step S10).

Next, whether the operation program has ended is determined, and when the operation program has ended (S11: YES), this processing is ended. When the operation program has not ended (S11: NO), the processing from step S3 is executed with new and adjusted parameters.

According to the aforementioned embodiment, by selecting an execution history, the execution history can be restored to a program and a user can perform adjustment of setting parameters of the program to which the execution history has been restored. Such a configuration enables a user to efficiently perform adjustment of the setting parameters of a program. As a result, improved usability in regard to the parameter adjustment of a program can be realized.

While the present invention has been described above by using the typical embodiments, it may be understood by a person skilled in the art that changes, and various other changes, omissions, and additions can be made to the aforementioned embodiments without departing from the scope of the present invention.

While an example of presenting an execution history screen (200 or 400) and a parameter adjustment screen (300 or 500) as separate screens is described in the aforementioned embodiment, the execution history screen and the parameter adjustment screen may be displayed on the same screen.

The system configuration and arrangement of the functional blocks illustrated in aforementioned FIG. 1 or FIG. 3 are examples, and may be modified from various perspectives. For example, the visual sensor may be a fixed camera fixed in a workspace where the robot system is placed. While an example of storing an execution history in the visual sensor controller is described in the aforementioned embodiment, the execution history may be collected by and stored in the teaching device.

The configuration described in the aforementioned embodiment is applicable to a system including an industrial machine, such as a robot or a machine tool, executing work by using information from various sensors. For example, the functions as the teaching device described in the aforementioned embodiment (such as display of an execution history screen and the image playback function) may be implemented on a controller of a machine tool (an NC controller) or an information processing device connected to the controller.

The functional blocks of the visual sensor controller, the robot controller, and the teaching device that are illustrated in FIG. 3 may be provided by executing various types of software stored in a storage device by processors in the devices or may be provided by a configuration mainly based on hardware such as an application specific integrated circuit (ASIC).

A program executing various types of processing, such as the image playback processing (the processing illustrated in FIG. 9) according to the aforementioned embodiment, may be recorded on various computer-readable recording media (such as semiconductor memories such as a ROM, an EEPROM, and a flash memory, a magnetic recording medium, and optical disks such as a CD-ROM and DVD-ROM).

REFERENCE SIGNS LIST

1 Workpiece
2 Workbench
10 Teaching device
11 Processor
12 Memory
13 Display unit
14 Operation unit
15 Input-output interface
20 Visual sensor controller
21 Control unit
22 Image processing unit
23 Storage unit
30 Robot
33 Hand
50 Robot controller
51 Processor 52 Memory
53 Input-output interface
54 Operation unit
70 Visual sensor
100 Robot system
111 Program generation unit
112 Execution history screen display unit
113 Adjustment screen display unit
151 Operation control unit
152 Storage unit
200, 400 Execution history screen
211, 411 History list display region
212, 412 History image display region
213, 413 Program display region
214, 414 Operation button display region
221, 421 Playback button
300, 500 Parameter adjustment screen
311, 511 Detection program display region
312, 512 Captured image display region
313, 513 Parameter display region
314, 514 Detection result display region
315, 515 Operation button display region
341, 541 Detection button

The invention claimed is:

1. A teaching device used in a system based on an industrial machine configured to acquire information by using a sensor and perform work on a workpiece, the teaching device comprising:

an execution history screen display unit configured to display an execution history screen presenting one or more execution histories related to an execution result of a program for performing processing using the sensor and accept an operation of selecting an execution history from the one or more execution histories; and an adjustment screen display unit configured, in response to the selecting the execution history from the one or more execution histories on the execution history screen, to restore the selected execution history to the program and display an adjustment screen for adjusting a setting parameter of the program to which the selected execution history has been restored.

2. The teaching device according to claim 1, wherein the adjustment screen display unit makes a transition to the adjustment screen in response to a predetermined user operation being performed in a state of an execution history being selected on the execution history screen.

3. The teaching device according to claim 1, wherein the sensor is a visual sensor, and the execution history includes at least one item out of a captured image, a position and a posture of a robot at measurement, a detection result of a workpiece, information about non-detection or erroneous detection, and a setting parameter of the program.

4. The teaching device according to claim 3, wherein, when the selected execution history is related to detection of a workpiece from a plurality of viewpoints by the visual sensor, the execution history screen display unit displays a plurality of history images of the workpiece captured from the plurality of viewpoints on a same screen.

5. The teaching device according to claim 4, wherein the adjustment screen display unit simultaneously displays the plurality of history images on the adjustment screen.

6. The teaching device according to claim 4, wherein the execution history screen display unit accepts an operation for selecting one of the plurality of history images, and the adjustment screen display unit displays the adjustment screen for adjusting a setting parameter related to the one selected history image.

7. The teaching device according to claim 1, wherein the execution history screen and the adjustment screen are displayed on a same screen.

8. A robot system comprising:

a sensor;

a robot;

a robot controller configured to acquire information from the sensor and cause the robot to execute predetermined work on a workpiece; and the teaching device according to claim 1 connected to the robot controller, wherein the robot controller controls execution of a program for performing processing using the sensor.

9. The robot system according to claim 8, wherein the sensor is a visual sensor, and the program is a detection program for detecting the workpiece by the visual sensor.

\* \* \* \* \*